(12) United States Patent
Huang

(10) Patent No.: US 7,857,448 B2
(45) Date of Patent: Dec. 28, 2010

(54) ASTIGMIA CORRECTING EYEGLASSES

(75) Inventor: Augustus Huang, Tainan (TW)

(73) Assignee: Proview Optical Group Corp., Tainan (TW)

( * ) Notice: Subject to any disclaimer, the term of this patent is extended or adjusted under 35 U.S.C. 154(b) by 135 days.

(21) Appl. No.: 12/379,004

(22) Filed: Feb. 11, 2009

(65) Prior Publication Data
US 2009/0147216 A1     Jun. 11, 2009

Related U.S. Application Data

(63) Continuation-in-part of application No. 11/417,101, filed on May 4, 2006, now abandoned.

(51) Int. Cl.
    *G02C 7/02*        (2006.01)
    *G02C 7/16*        (2006.01)

(52) U.S. Cl. .......................... 351/176; 351/46; 351/163
(58) Field of Classification Search ................. 351/176, 351/46
See application file for complete search history.

(56) References Cited

U.S. PATENT DOCUMENTS

| | | | | |
|---|---|---|---|---|
| 4,452,516 A | * | 6/1984 | Salia-Munoz | 351/45 |
| 4,749,272 A | * | 6/1988 | Salia | 351/46 |
| 4,958,922 A | * | 9/1990 | Binh et al. | 351/46 |
| 4,989,967 A | * | 2/1991 | Matsuda | 351/165 |
| 5,485,227 A | * | 1/1996 | Lin | 351/46 |
| 2008/0273164 A1 | * | 11/2008 | Shuster | 351/158 |

* cited by examiner

*Primary Examiner*—Jordan M. Schwartz
(74) *Attorney, Agent, or Firm*—Rosenberg, Klein & Lee

(57) ABSTRACT

An astigmia correcting eyeglasses includes two non-transparent lenses respectively provided with a plurality of cone-shaped through holes. The cone-shaped through holes respectively have a larger diameter at an inner side than that at an outer side. The cone-shaped through holes located nearer the circumference of the lens have a larger inclined angle at the side near the circumference of the lens than those located in the center portion of the lens. Therefore the focusing function is intensified by the cone-shaped through holes, which does not obstruct the viewing lines of a user, so that there may not occur dead angles, or blind spots in using the astigmia correcting eyeglasses according to the invention.

1 Claim, 7 Drawing Sheets ated as a Continuation-in-
ASTIGMIA CORRECTING EYEGLASSES

REFERENCE TO RELATED APPLICATION

This patent application is being filed as a Continuation-in-Part of patent application Ser. No. 11/417,101, filed 4 May 2006 now abandoned.

BACKGROUND OF THE INVENTION

1. Field of the Invention

This invention relates to a pair of astigmia correcting eyeglasses, particularly to one provided with better effectiveness for focusing point and to be used by a person suffering from astigmia.

2. Description of the Prior Art

Astigmia is a kind of eye flaw that eyeballs deflect light incorrectly, and the light deflecting system of the eyeball is composed of a cornea and a crystalline lens. If the outer surface of the light deflecting system becomes not perfectly circular, parallel rays of light coming from an exterior source do not converge on a single focal point on the retina and become plural images a little superposed on each other, and then this is called astigmia or astigmatism.

Conventional astigmia eyeglasses shown in FIG. 9, includes non-transparent lenses 2 provided with many post-shaped through holes 21, and each post-shaped through hole 21 has a cross-section circular or hexagonal, enabling parallel light of images seen through the holes 21 converge on a focal point on the retina for correcting the astigmia of a person, achieving the correcting purpose.

However, although the conventional astigmia correcting eyeglasses can obtain the correcting effect, its focusing effect is not so good as expected, because the viewing line of a user may be hidden by the post-shaped through holes to result in bad focusing function when the user sees an exterior object through the many through holes in the lenses, easily producing blind spots or a dead angle. And the reason is that the post-shaped through holes have the same diameter at two ends, and the lenses are curved to correspond to a facial surface.

SUMMARY OF THE INVENTION

The feature of the invention is a plurality of cone-shaped through holes provided in each lens of a pair of astigmia correcting eyeglasses. The cone-shaped through holes respectively have a larger diameter at an inner side than that at an outer side, and the cone-shaped through holes located nearer the circumference of the lens have larger inclined angles at a side near the circumference of the lens than the cone-shaped through holes located in the center portion.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
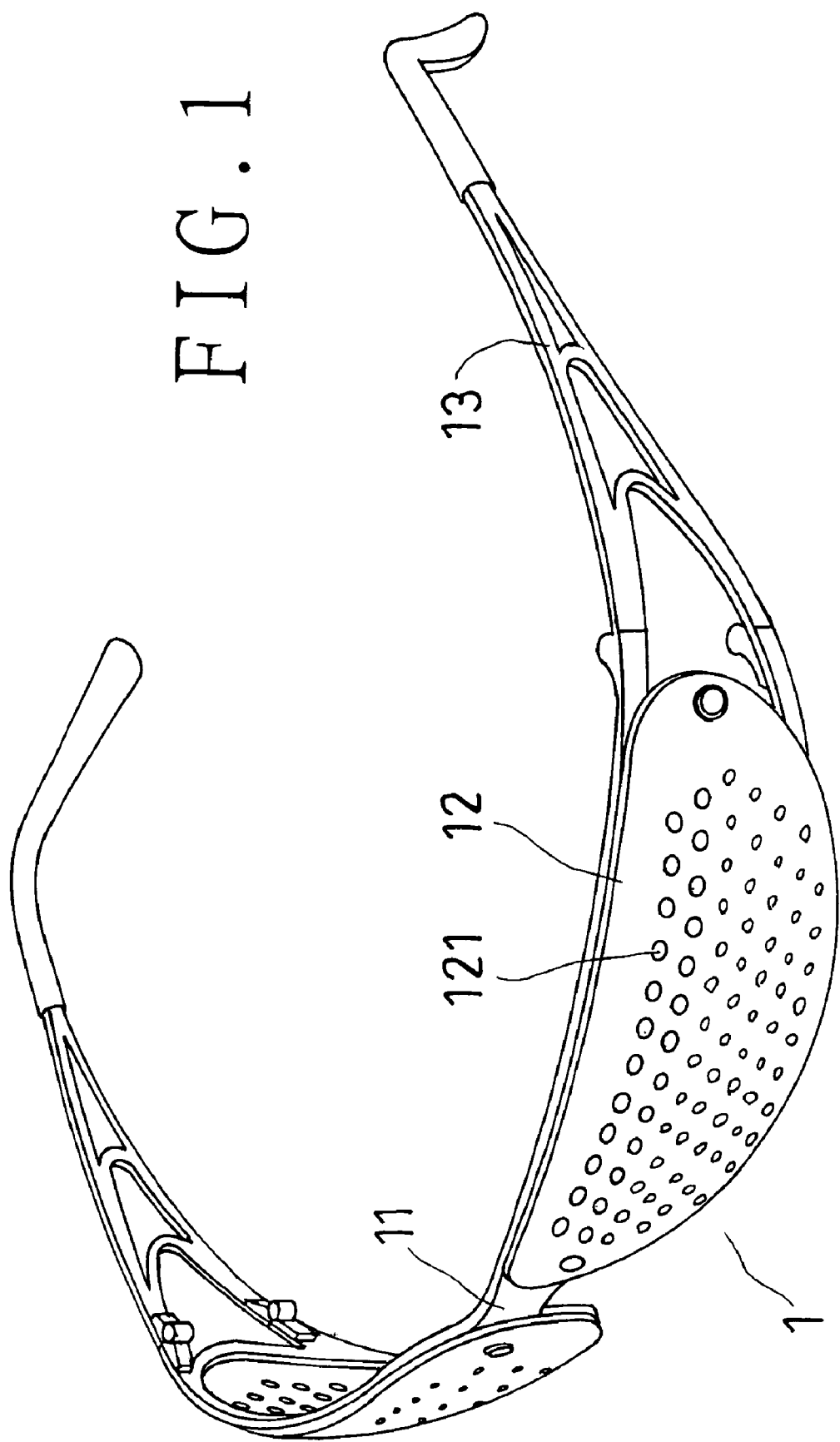
FIG. 1 a perspective view of an astigmia correcting eyeglasses in the present invention.
Figure 2:
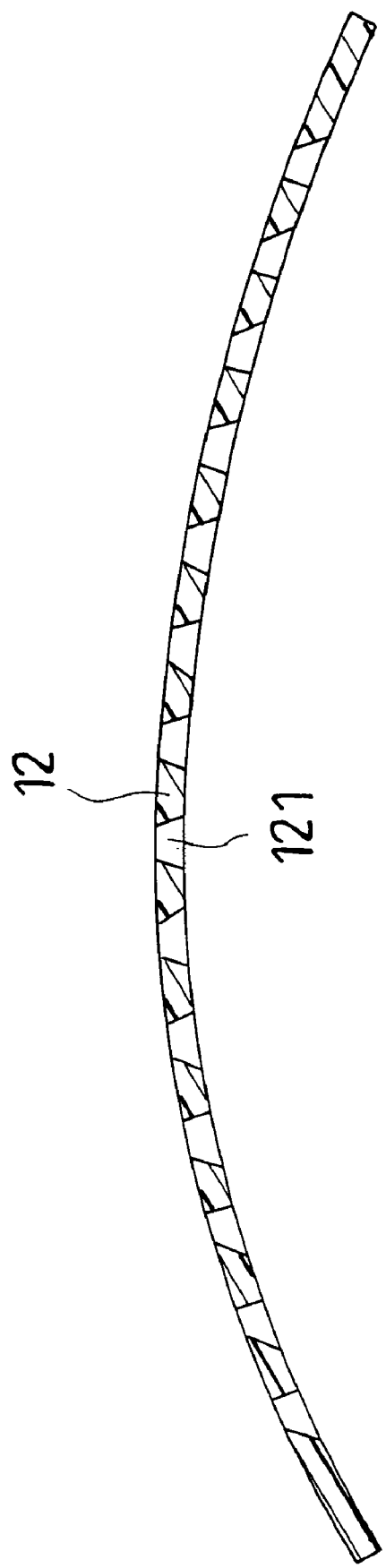
FIG. 2 is a top cross-sectional view of the astigmia correcting eyeglasses lens in the present invention.
Figure 3:
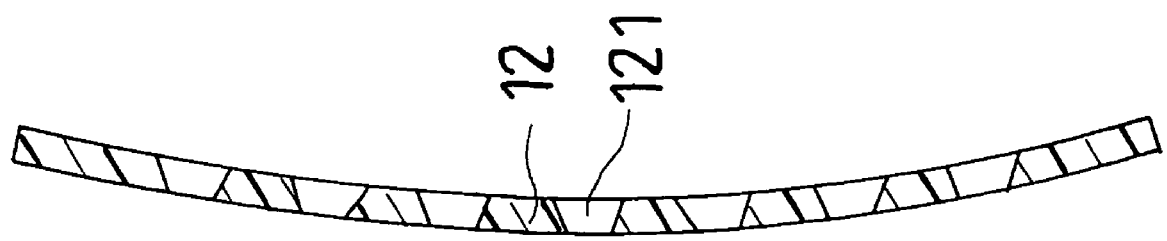
FIG. 3 is a side cross-sectional view of the astigmia correcting eyeglasses lens in the present invention.
Figure 5:
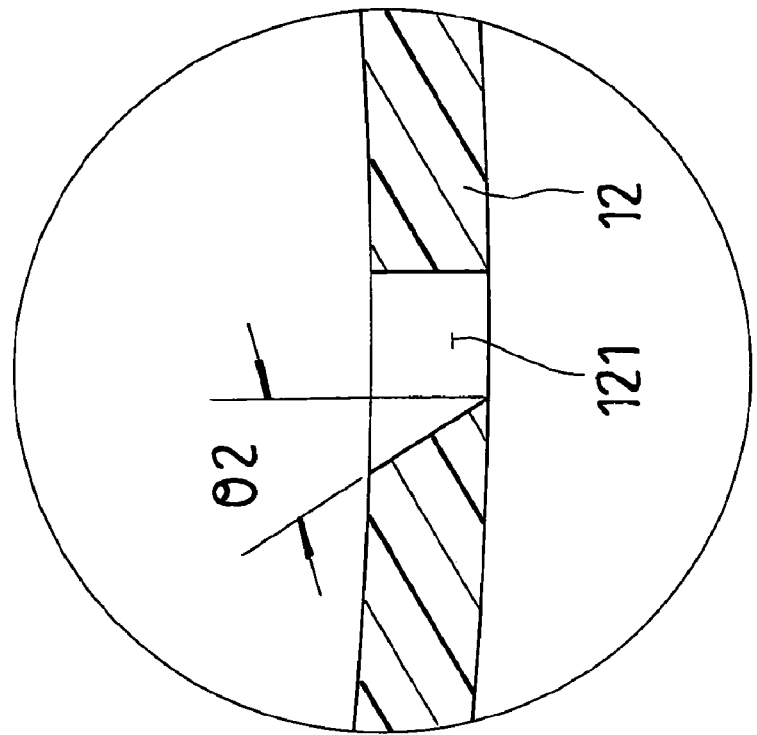
FIG. 5 is a second partly magnified top cross-sectional view of the astigmia correcting eyeglasses lens in the present invention.
Figure 4:
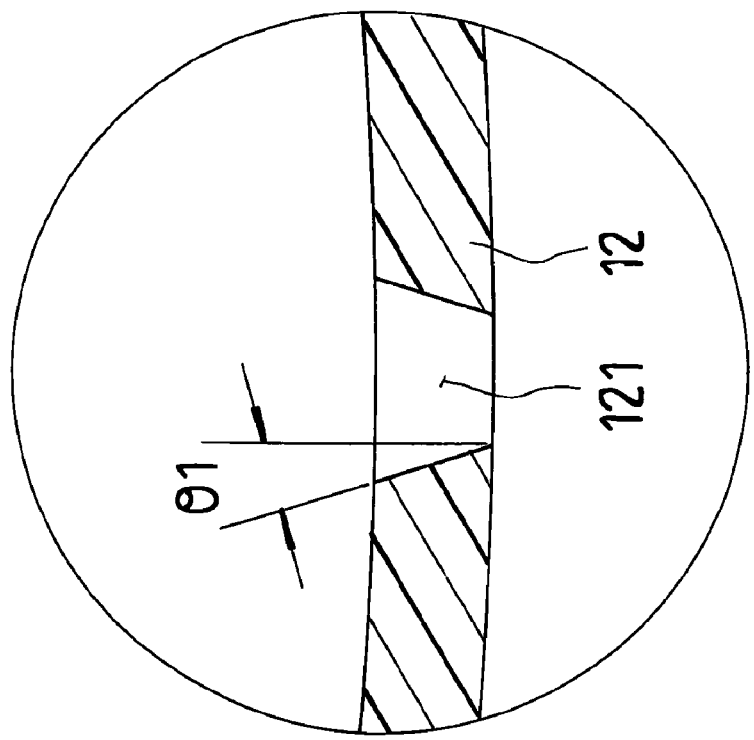
FIG. 4 is a first partly magnified top cross-sectional view of the astigmia correcting eyeglasses lens in the present invention.
Figure 6:
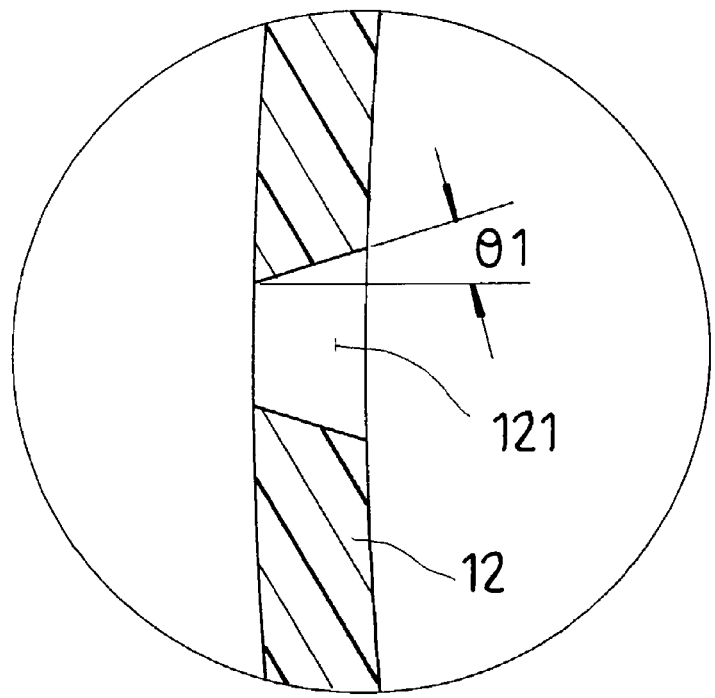
FIG. 6 is a first partly magnified side cross-sectional view of the astigmia correcting eyeglasses lens in the present invention.
Figure 7:
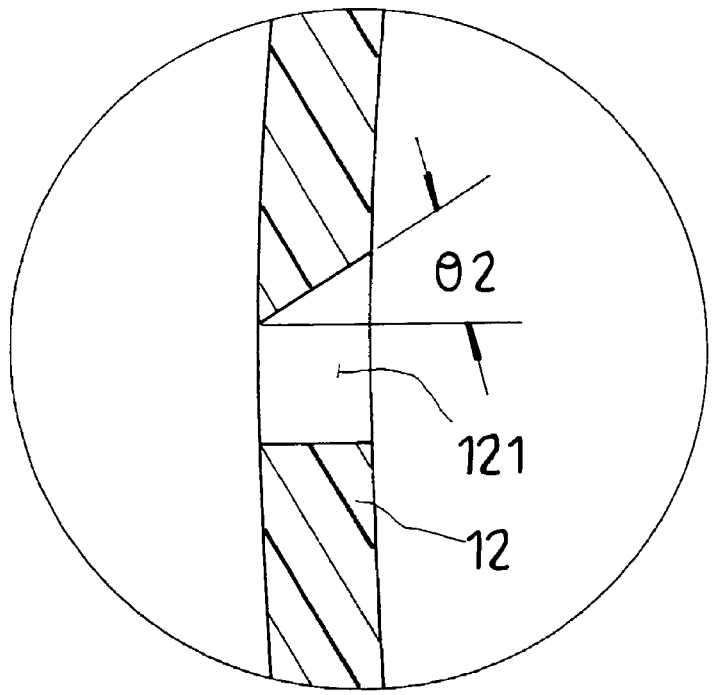
FIG. 7 is a second partly magnified side cross-sectional view of the astigmia correcting eyeglasses lens in the present invention

A preferred embodiment of an astigmia correcting eyeglasses in the present invention, as shown in FIGS. 1, 2 and 3, includes a lens frame 11, two non-transparent lenses 12, and two temples 13 as main components combined together.

The lenses 12 are respectively provided with a plurality of cone-shaped through holes 121, which respectively have a large diameter at an inner side than that at an outer side. Referring to FIGS. 4-7, the cone-shaped through holes 121 located nearer to the circumference of the lens 12 are provided with larger inclined angles at the side near the circumference of the lens 12 than those 121 located in the center portion.

Figure 8:
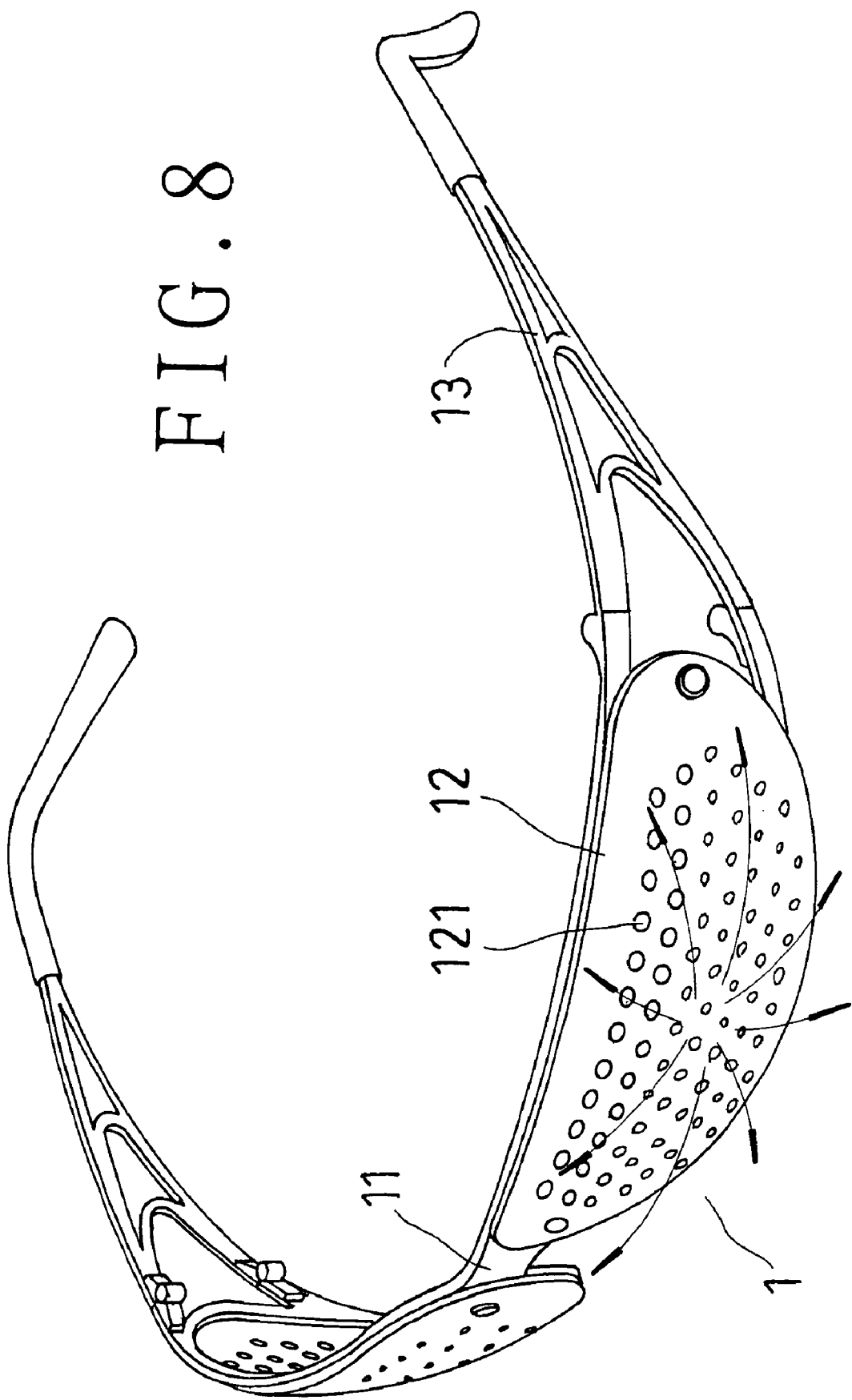
FIG. 8 is a perspective view of a pair of eyeglasses with the astigmia correcting lenses in the present invention.
Figure 9:
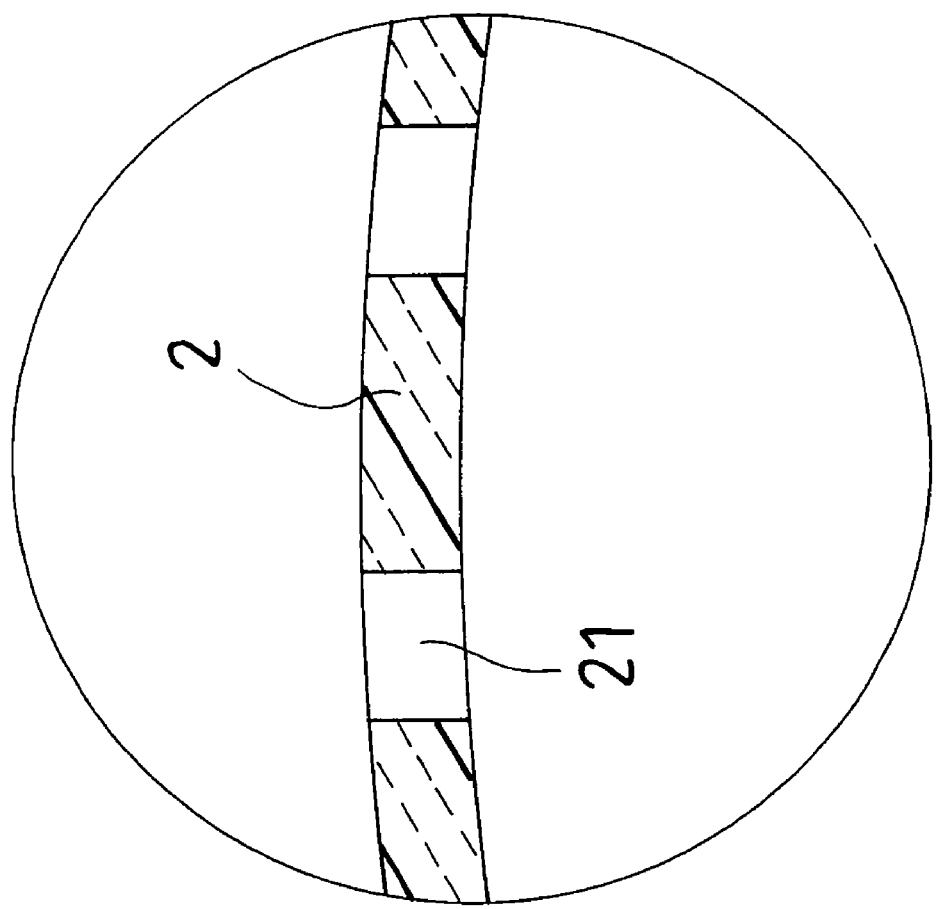
FIG. 9 is a cross sectional view of a conventional astigmia correcting eyeglasses lens.

Therefore, further referring to FIG. 8, when a user wears the astigmia correcting eyeglasses in the invention, the user sees through the lenses 12 via the cone-shaped through holes 121 an external object, so there occur no dead angles or blind spots for the view of the user because of the intensified augment of focusing function of the cone-shaped through holes 121.

Compared with the conventional astigmia correcting eyeglasses, the astigmia correcting eyeglasses according to the invention have the two lenses provided with the cone-shaped through holes having a larger diameter at the inner side than that at the outer side, and the cone-shaped through holes located nearer to the circumference of the lens have larger inclined angles at the side near the circumference of the lens than those located in the center portion, so that there may not occur dead angles or blind spots when the person sees through the lenses of the astigmia correcting eyeglasses in the invention owing to the better focusing function, with the viewing lines of the user not obstructed by the through holes because of the cone-shape of the through holes.

While the present invention has been described above, it will be recognized and understood that various modifications may be made therein and the appended claimed are intended to cover all such modifications that may fall within the spirit and scope of the invention.

What is claimed is:

1. Astigmia correcting eyeglasses comprising two non-transparent lenses sustained by a frame, and two temples:
   said non-transparent lenses respectively provided with a plurality of cone-shaped through holes, each said cone-shaped through hole having a large diameter at an inner side than that at an outer side, said cone-shaped through holes located nearer a circumference of each said lens having larger inclined angles at a side near said circumference of each said lens than said cone-shaped through holes located in a center portion of each said lens; and,
   said cone-shaped through holes intensifying focusing function of said lenses.

* * * * *